United States Patent
Fan et al.

(10) Patent No.: US 8,416,779 B2
(45) Date of Patent: Apr. 9, 2013

(54) STORED TRANSMISSION PACKET INTENDED FOR USE IN NEW LINK-ADAPTATON MECHANISM, AND APPARATUS AND METHOD FOR TRANSMITTING AND RECEIVING TRANSMISSION PACKET USING THE SAME

(75) Inventors: Guoping Fan, Suwon-si (KR); Chang-yeul Kwon, Yongin-si (KR); Se-young Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 828 days.

(21) Appl. No.: 11/727,069

(22) Filed: Mar. 23, 2007

(65) Prior Publication Data

US 2007/0286196 A1 Dec. 13, 2007

Related U.S. Application Data

(60) Provisional application No. 60/811,793, filed on Jun. 8, 2006.

(30) Foreign Application Priority Data

Sep. 20, 2006 (KR) .................. 10-2006-0091359

(51) Int. Cl.
 *H04L 12/56* (2006.01)
(52) U.S. Cl.
 USPC .................. 370/392; 370/369; 370/474
(58) Field of Classification Search .................. 370/474, 370/343, 216, 514
 See application file for complete search history.

(56) References Cited

U.S. PATENT DOCUMENTS

| | | | | |
|---|---|---|---|---|
| 5,197,067 A * | 3/1993 | Fujimoto et al. | ............. | 370/236 |
| 6,959,014 B2 * | 10/2005 | Pohlmeyer et al. | ............ | 370/514 |
| 6,993,101 B2 * | 1/2006 | Trachewsky et al. | ......... | 375/343 |
| 2002/0031122 A1 * | 3/2002 | Martini et al. | ................ | 370/389 |
| 2004/0246919 A1 * | 12/2004 | Larsson | ...................... | 370/328 |
| 2005/0249244 A1 * | 11/2005 | McNamara et al. | .......... | 370/474 |
| 2005/0286410 A1 * | 12/2005 | Truong et al. | ................. | 370/216 |
| 2006/0240799 A1 * | 10/2006 | Kim et al. | .................. | 455/343.2 |
| 2007/0225044 A1 * | 9/2007 | Law et al. | .................. | 455/562.1 |

* cited by examiner

*Primary Examiner* — Dang Ton
*Assistant Examiner* — Pamit Kaur
(74) *Attorney, Agent, or Firm* — Sughrue Mion, PLLC

(57) ABSTRACT

A stored transmission packet having a structure intended for use in a new link-adaptation mechanism, and a method and an apparatus for transmitting the transmission packet using the same are disclosed. The structure includes a payload composed of a plurality of transmission data units, a MAC header appended to the payload, and a PHY header appended to the MAC header, wherein the payload includes a link recommendation command in which information on a transmission mode is recorded, among a link-adaptation mechanism including Link Assessment, in which the state of a channel used to transmit and receive the transmission packet and the quality thereof is assessed, Link Recommendation, in which a transmission mode suitable for a current channel state is recommended using the result of Link Assessment, and Link Adjustment, in which the channel state is adjusted using information on the recommended transmission mode.

29 Claims, 7 Drawing Sheets

LR : Link Recommendation

FIG. 6B

LR : Link Recommendation

| HRP mode index | Coding mode | Modulation | Code rate | |
|---|---|---|---|---|
| | | | GROUP 1 [7] [6] [5] [4] | GROUP 2 [3] [2] [1] [0] |
| 0 | EEP | QPSK | 1/3 | |
| 1 | | QPSK | 2/3 | |
| 2 | | 16-QAM | 2/3 | |
| 3 | UEP | QPSK | 4/7 | 4/5 |
| 4 | | 16-QAM | 4/7 | 4/5 |
| 5 | MSB-only retransmission | QPSK | 1/3 | infinite |
| 6 | | 16-QAM | 1/3 | infinite |

STORED TRANSMISSION PACKET INTENDED FOR USE IN NEW LINK-ADAPTATON MECHANISM, AND APPARATUS AND METHOD FOR TRANSMITTING AND RECEIVING TRANSMISSION PACKET USING THE SAME

CROSS-REFERENCE TO RELATED APPLICATION

This application claims priority from U.S. Provisional Application No. 60/811,793 filed on Jun. 8, 2006, in the USPTO and Korean Patent Application No. 10-2006-0091359 filed on Sep. 20, 2006, in the Korean Intellectual Property Office, the disclosures of which are incorporated herein in their entirety by reference.

BACKGROUND OF THE INVENTION

1. Field of the Invention

Apparatuses and methods consistent with the present invention relate to wireless telecommunications, and more particularly to a stored transmission packet having a structure intended to for use in a new link-adaption mechanism, and transmitting the transmission packet.

2. Description of the Related Art

In line with the increase in wireless network use and demand in mass data transmission, research on efficient transmission methods is desired.

Moreover, there is great demand for wireless transmissions of high quality video images such as digital video disk (DVD) and high definition television (HDTV) images to a variety of home devices.

Currently, one of the IEEE 802.15.3c task groups is establishing the technical standard for the transmission of mass data in a wireless home network. This standard, called Millimeter (mm) Wave, uses radio waves having millimeter wavelengths, i.e., a frequency in the range of 30 GHz to 300 GHz in order to transmit the mass data. This frequency range is unlicensed, and thus its use has been limited to telecommunication services, radio astronomy, and the prevention of automotive collisions.

Figure 1:
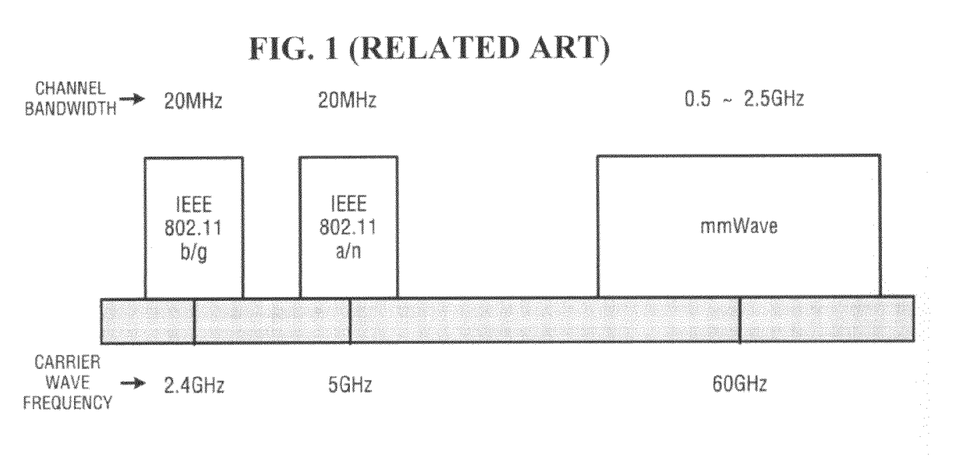
FIG. 1 is a drawing illustrating a comparison of the IEEE 802.11 standard frequency band and mmWave.

FIG. 1 is a drawing illustrating a comparison between the IEEE 802.11 standard frequency band and that of mmWave. IEEE 802.11b and IEEE 802.11g have a carrier frequency of 2.4 GHz and a bandwidth of 20 MHz. In addition, IEEE 802.11a and IEEE 802.11n have a carrier frequency of 5 GHz and a bandwidth of 20 MHz. Conversely, mmWave has a carrier frequency of 60 GHz, and a bandwidth in the range of 0.5 to 2.5 GHz. Hence, mmWave uses a higher frequency band and a wider bandwidth than conventional IEEE 802.11 standards. As mentioned above, using high frequency signals (mmWave), data can be transmitted at a high rate (Gbps), and the size of an antenna can be set to 1.5 mm or less, thereby allowing the antenna to be included in a single chip. In addition, using high frequency signals, interference among the devices can be reduced due to the high attenuation ratio in air.

Recently, research on transmitting uncompressed audio or video data (hereinafter, referred to as "AV data") among wireless devices using the high frequency band of mmWave. AV data is compressed by removing portions which humans are less sensitive to through motion compensation, DCT conversion, quantization, variable length coding, but uncompressed AV data includes unmodified digital values denoting pixel elements (i.e., R, G, and B).

Figure 2:
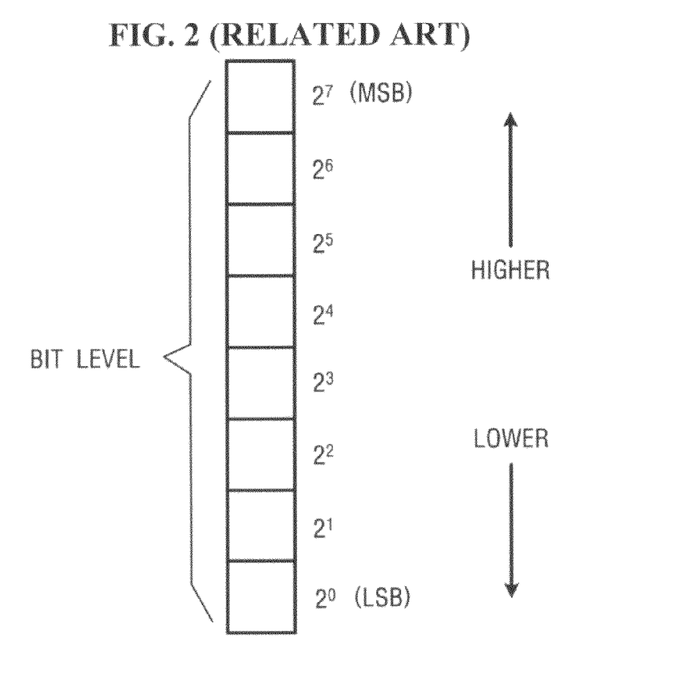
FIG. 2 is a drawing illustrating a pixel component represented as a plurality of bit levels.

Accordingly, bits included in the compressed AV data are equally significant, whereas bits included in the uncompressed AV data are not. For example, referring to FIG. 2, a pixel component is represented as 8 bits in the case of an 8-bit image. The bit with the highest degree (the highest-level bit) is the most significant bit (MSB), and the bit with the lowest degree (the lowest-level bit) is the least significant bit (LSB). That is, each bit of 1-byte data has a different significance when restoring audio signals. When an error occurs in the most significant bit during transmission, it is easier to detect the error than when it occurs in other bits. Accordingly, compared to the bit data with less significance, the bit data with more significance should be protected to prevent the error from occurring during wireless transmission. However, the conventional IEEE 802.11 standards use an error-correction method or a retransmission method in which all bits have the same coding rate.

Figure 3:
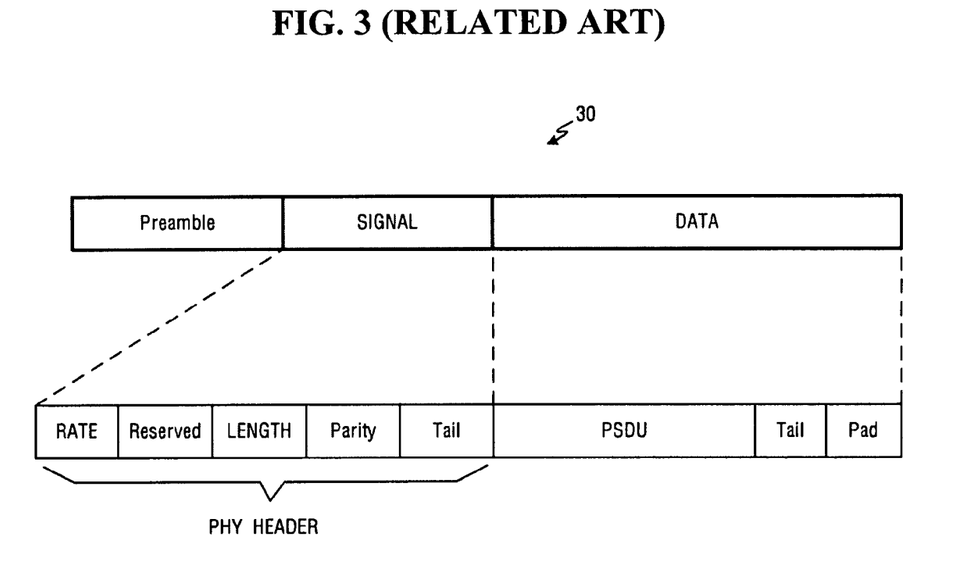
FIG. 3 is a drawing illustrating a configuration of the IEEE 802.11a PPDU.

FIG. 3 is a drawing illustrating a configuration of the IEEE 802.11a physical protocol data unit (PPDU). A PPDU 30 includes a preamble, a signal field, and a data field. The preamble is used for the synchronization of a PHY layer and channel estimations, including a plurality of short training signals and long training signals. The signal field includes a "RATE" field that indicates a transmission rate and a "LENGTH" field that indicates the length of the PPDU. Generally, the signal field is coded by a symbol. The data field comprises a physical layer service data unit (PSDU), a tail bit, and a pad bit and the data to-be-transmitted is included in the PSDU.

A link adaptation mechanism, used to selectively adapt to an ever-changing channel state, exits between a transmitter that transmits uncompressed AV data and a receiver that receives the uncompressed AV data. A link is adapted according to a transfer environment by adjusting parameters such as a data rate, a transmission-frame size, and transmitter/receiver power.

However, the starting point and execution method thereof are dependent on the number of valid ACK frames in the current link-adaptation mechanism, which renders the mechanism dependent on a reverse channel state where the data is transferred from a sink device to a source device as opposed to a forward channel state where the data is transferred from the source device to the sink device. Accordingly, it is unable to execute a smooth link-adaptation mechanism.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

In view of the above, an aspect of the present invention provides a new link-adaptation mechanism that can efficiently and reasonably adapt to a constantly changing transmission state in a high frequency wireless telecommunications, and a stored transmission packet used therein.

Another aspect of the present invention provides an apparatus and method for transmitting and receiving a transmission packet in a new link-adaptation mechanism.

These and other aspects of the present invention will become clear to those skilled in the art upon review of the following description, attached drawings and appended claims.

According to an aspect of the present invention, there is provided a stored transmission packet having a structure intended for use in a new link-adaptation mechanism, including a payload composed of a plurality of transmission data units; a MAC header appended to the payload; and a PHY header appended to the MAC header, wherein the payload includes a structure of a link recommendation command, in which information on a specific transmission mode that can be recommended in a Link Recommendation operation is recorded, among a link-adaptation mechanism including a Link Assessment operation, in which a state of a channel transmitting/receiving the transmission packet and the quality of the transmission packet are assessed, a Link Recommendation operation, in which a transmission mode suitable for a current channel state is recommended using the result of the Link Assessment operation, and a Link Adjustment operation, in which a channel state is adjusted using information on the recommended transmission mode.

According to another aspect of the present invention, there is provided a transceiver using a new link-adaptation mechanism, the apparatus including a payload composed of a plurality of transmission data units; a MAC header appended to the payload; and a PHY header appended to the MAC header, wherein the payload includes a structure of a link recommendation command, in which information on a specific transmission mode that can be recommended in a Link Recommendation operation is recorded, among a link-adaptation mechanism including a Link Assessment operation, in which a state of a channel transmitting/receiving the transmission packet and the quality of the transmission packet are assessed, a Link Recommendation operation, in which a transmission mode suitable for a current channel state is recommended using the result of the Link Assessment operation, and a Link Adjustment operation, in which the channel state is adjusted using information on the recommended transmission mode.

According to a still further aspect of the present invention, there is provided a method of transmitting and receiving a transmission packet using a new link-adaptation mechanism, the method including reading the transmission packet, wherein the packet includes information on a recommended transmission mode; and performing a new link-adaptation mechanism based on the contents of the transmission packet, wherein the new link-adaptation mechanism including performing a Link Assessment operation, in which a state of a channel for at least one of transmitting and receiving the transmission packet and a quality of the transmission packet are assessed; performing a Link Recommendation operation, in which a transmission mode suitable for a current channel state is recommended using a result of the Link Assessment operation; and performing a Link Adjustment operation, in which the state of the channel is adjusted using information on the recommended transmission mode.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will be described in detail with reference to the accompanying drawings.

Aspects of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

Figure 4:
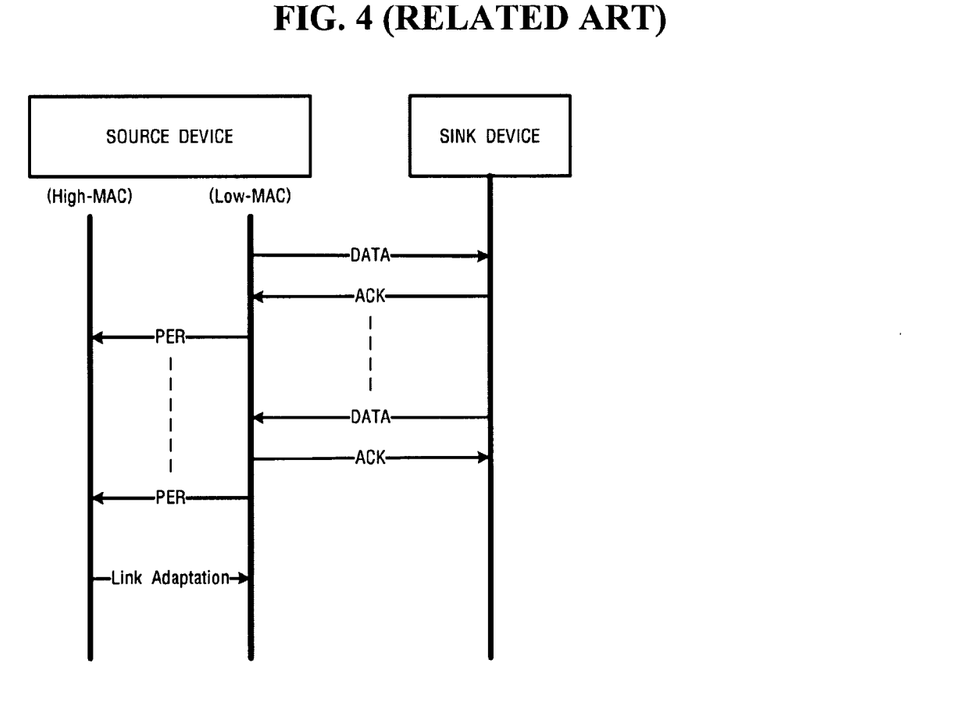
FIG. 4 is a drawing illustrating a link-adaptation mechanism according to the related art.

FIG. 4 is a drawing illustrating a link-adaptation mechanism according to the related art. A source device and a sink device exchange messages with respect to channel information using a predetermined management frame. Specifically, the source device transmits a series of data frames to the sink device, and receives an ACK frame that confirms successful frame receipt. A low MAC channel of the source device reports a packet error rate (PER) to a high MAC channel based on information recorded in the received ACK frame. The high MAC channel does not initiate link adaptation (LA) until the PER falls below a predetermined threshold.

In the link-adaptation mechanism illustrated in FIG. 4, when the link adaptation is initiated and how it is executed is dependent on the ACK frame information such as the number of valid ACK frames and the PER. Generally, the forward channel has a higher data rate than the reverse channel, and thus is more subject to elements such as noise and interference. Accordingly, the forward channel state has a greater influence on transmission quality than the reverse channel state. Since the ACK frame information and the PER indicates a reverse channel state where the data is transferred from the sink device to the source device, the ACK frame information and the PER is unable to utilize information on a forward channel state, and is dependent on information on the forward channel state where the data is transferred from the source device to the sink device.

In order to resolve such a problem, a new link-adaptation mechanism is proposed, in which a specific transmission mode is divided into a high rate PHY mode and low rate PHY mode, and a link recommendation command structure including the two modes is loaded inside a payload of a transmission packet, and is transmitted or received.

Figure 5:
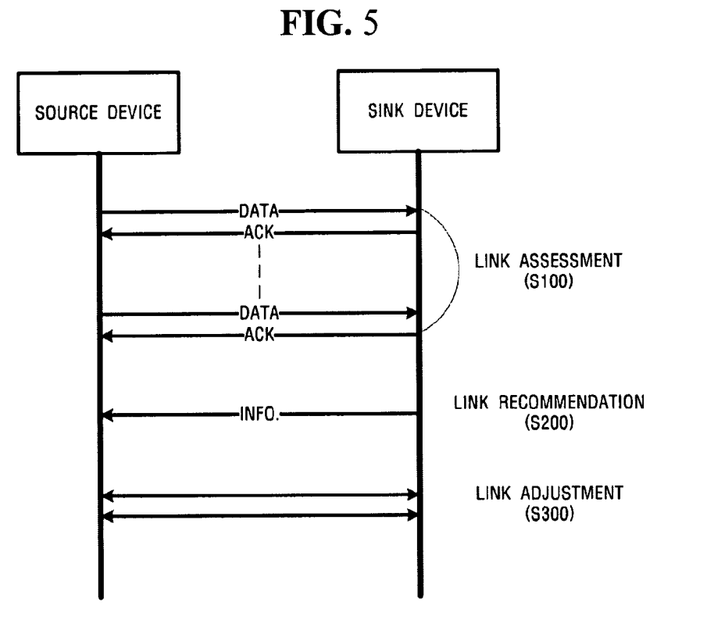
FIG. 5 is a drawing illustrating a new link-adaptation mechanism according to an exemplary embodiment of the present invention.

FIG. 5 is a drawing illustrating a new link-adaptation mechanism according to an exemplary embodiment of the present invention. As illustrated in FIG. 5, the new link adaptation comprises three operations.

Link Assessment S100 is described as follows.

A source device transmits data to a sink device. The sink device assesses a channel state and a transmission packet quality, and generates recommended setting information of a transmission mode that is adapted to a current channel state using the result of the assessment S100. The recommended setting information of the transmission mode includes information on an unequal error protection (UEP) mode, a PHY mode, and a link-adjustment-recommendation mask that is used to decide whether a link adjustment should be made.

Link Recommendation S200 is described in the following. Link Recommendation is a process of recommending a link by having the sink device transmit the packet including the generated recommended setting information of the transmission mode to the source device. The source device acquires information on forward channel state and the recommended setting information of the transmission mode recommended by the sink device.

Two management frames are used in the Link Recommendation, i.e., a link-recommendation-request command and a link-recommendation-response command. The structure of these two frames is included in a payload area as opposed to a header area, and is transmitted. The Link Recommendation operation is further divided into an active mode and a passive mode, which will be described hereinafter with reference to FIGS. 6A and 6B.

Figure 6A:
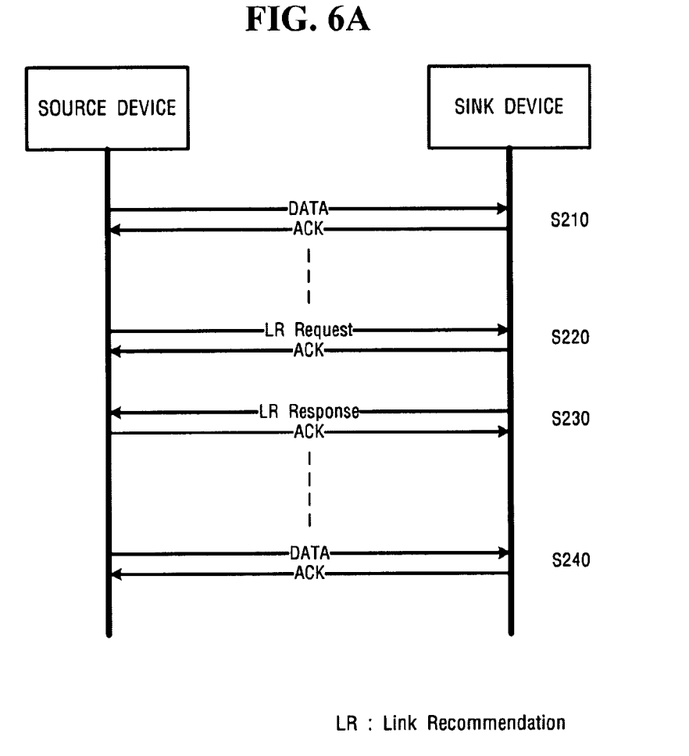
FIG. 6A is a drawing illustrating an active Link Recommendation in a new link-adaptation mechanism.
Figure 6B:
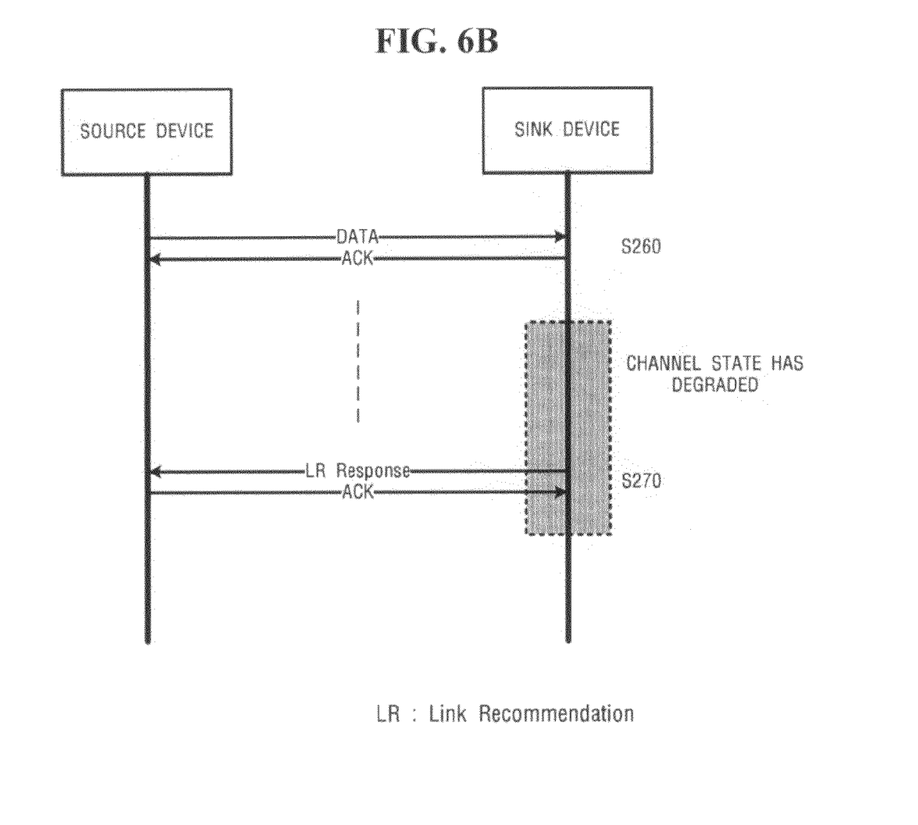
FIG. 6B is a drawing illustrating a passive Link Recommendation in a new link-adaptation mechanism.

FIG. 6A is a drawing illustrating an active Link Recommendation in a new link-adaptation mechanism, and FIG. 6B is a drawing illustrating a passive Link Recommendation therein.

Referring to FIG. 6A, a source device transmits data to a sink device, and receives an ACK message S210. During data transmission, the source device also transmits a link-recommendation-request command to the sink device, and receives an ACK message S220. The sink device generates recommended setting information of a transmission mode that is adapted to a current channel state, transmits a link-recommendation-response command to the source device, and receives an ACK message S320.

The source device acquires real-time information on the channel state and the signal quality from the sink device. The source device transmits the data to the sink device based on the acquired information, and receives an ACK message S240. If the channel state changes or the signal quality degrades, the source devices transmits a link-recommendation-request command to the sink device, and executes a process in which the sink device acknowledges receipt of the link-recommendation-response command S220 and S230.

A passive mode, which will be described with reference to FIG. 6B, is where the sink device independently transmits a link-recommendation-response command to the source device without a link-recommendation-request command transmitted from the source device. In the passive mode, the sink device independently determines whether the information on the channel state or the signal quality should be provided, or when the information should be provided. Link Recommendation in the passive mode is a process where the sink device independently determines the channel state has graded in a way that the transmission and receipt of the data cannot be executed, and recommends the recommended setting information of the transmission mode. That is, if the channel state has degraded during transmission or receipt of data and the ACK message S260, the sink device transmits the link-recommendation-response command, and then receives the ACK message S270.

The active and passive modes may be separately or jointly applied depending on the channel state.

Referring back to FIG. 5, the source device executes Link Adjustment by moderately adjusting parameters such as unequal error-protection (UEP) information, beam-searching information, a high-rate PHY (HRP) mode, and a low-rate PHY (LRP) mode that are included in the setting information of the transmission mode recommended by the sink device S300. That is, the source device receives the data containing the setting information (the link-recommendation-response command), and determines whether Link Adjustment should be executed based on the received setting information and a current channel state.

The source device and the sink device in the aforementioned link-adaptation mechanism are concepts introduced in order to describe the exemplary embodiment of the present invention by emphasizing the flow of data. Hence, the source device may be a transmitter or a receiver and the sink device may work as the transmitter or the receiver.

Figure 7:
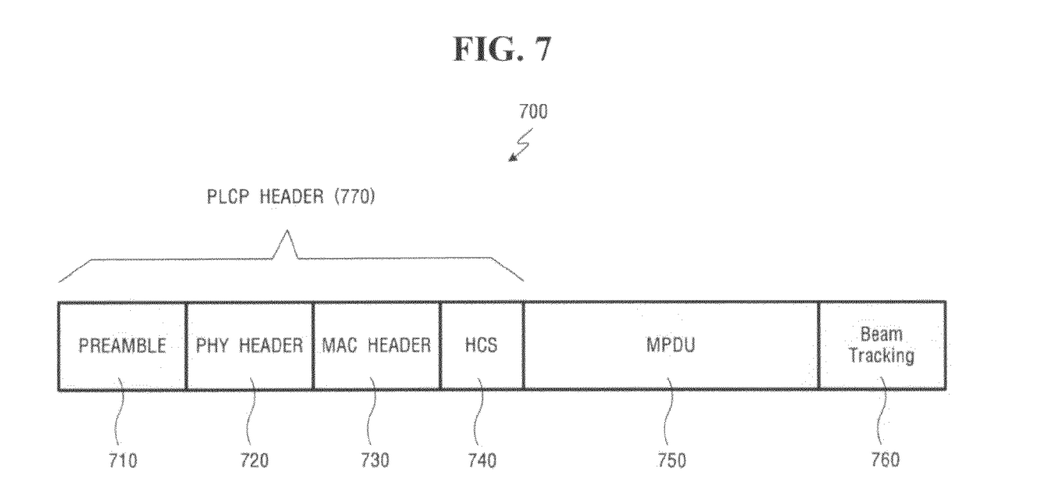
FIG. 7 is a drawing illustrating a stored transmission packet having a structure according to an exemplary embodiment of the present invention.

FIG. 7 is a drawing illustrating a stored transmission packet having a structure according to an exemplary embodiment of the present invention. A transmission packet 700 includes a physical layer convergence protocol (PLCP) header, a MAC protocol data unit (MPDU) field 750, a beam-tracking field 760. The PLCP header 770 includes a preamble 710, a PHY header 720, a MAC header 730, and a header check sequence (HCS) field 740.

The preamble 710 is a signal used for PHY layer synchronization and a channel estimation including a plurality of short and long training signals.

The PHY header 720 is an area formed based on information used in the PHY layer and the MAC header 730 is an area formed based on information used in the MAC layer. The HCS field 740 is an area used to check whether a head error has occurred.

The MPDU 750 is an area where data-to-be-transmitted, i.e., uncompressed AV data that has been error-correction-coded at a predetermined code rate. In addition, the MPDU 750 is also an area including a link recommendation command structure in which information on a specific transmission mode (e.g., an HRP mode and an LRP mode) that is recommended in Link Recommendation is recorded. The link recommendation command structure will be described with reference to FIG. 8.

The beam-tracking field 760 is an area where additional information for beam steering is recorded. The beam steering is to set directivity of an antenna so as to fit a reception direction of a wireless signal. For example, in order to receive the wireless signal having the directivity, a receiver receives identical wireless signals in different phases from an array antenna, estimates direction of arrival (DOA) through a discrete Fourier transform (DFT) algorithm, sets the directivity of the received signals with a combination of amplitude and the phase, and then adapts the array antenna to a corresponding direction. As described above, the beam-tracking field 760 records information referred to when the directivity of the antenna is set by the receiver.

Figure 8:
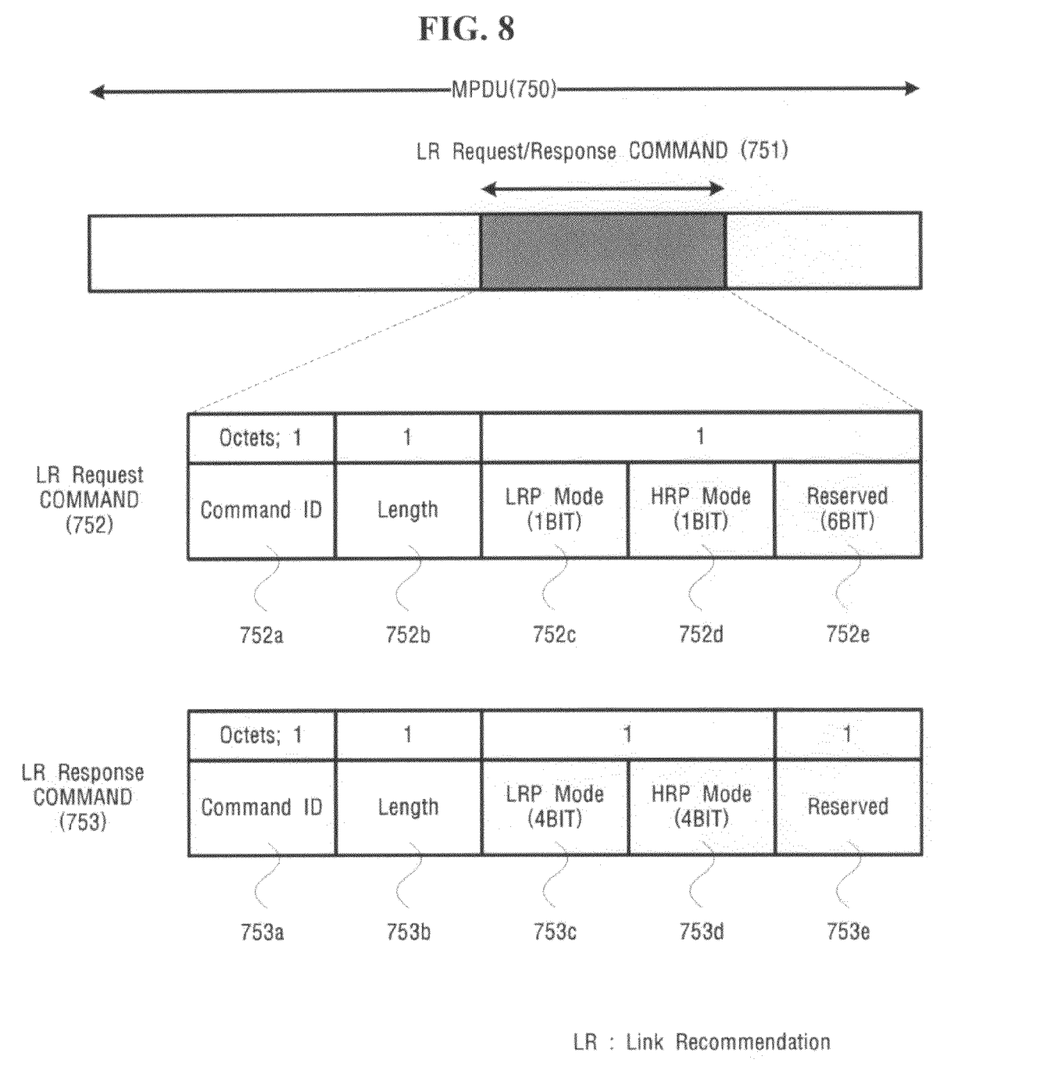
FIG. 8 is a drawing illustrating a structure of a link recommendation command frame 751 according to an exemplary embodiment of the present invention.

Hereinafter, among the aforementioned stored transmission packets, the MPDU 750, i.e., the role of a payload in the exemplary embodiment of the present invention will be described with reference to FIG. 8. FIG. 8 is a drawing illustrating a structure of a link recommendation command frame 751 according to an exemplary embodiment of the present invention. Referring to FIG. 8, the MPDU 750, also known as the payload includes the structure of the link recommendation command 751 that records information on a specific transmission mode that may be recommended in Link Recommendation.

Here, the specific transmission mode includes a high-rate PHY mode recording a high-rate PHY index and a low-rate PHY mode recording a low-rate PHY index.

There are two channels in a link-adaptation mechanism. One is a high-rate PHY (HRP) channel having a data rate 1-99 Gbps and the other is a low-rate PHY (LRP) channel having a data rate of tens of Mbps. Therefore, HRP mode fields 752$d$ and 753$d$ and LRP mode fields 752$c$ and 753$c$ are separately recorded in a lower field of the link recommendation command frame 751.

Figure 9:
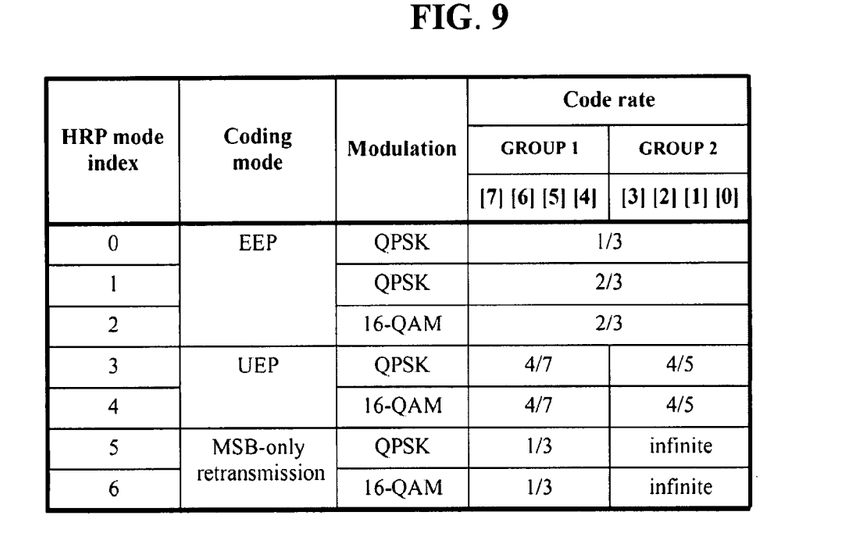
FIG. 9 is a drawing illustrating an high-rate PHY (HRP) mode index table according to an exemplary embodiment of the present invention.

Specifically, the HRP mode fields 752$d$ and 753$d$ record a mode index that is a combination of information on a coding mode, a modulation method, the number of bit levels included in a transmission data unit, and a code rate of the bit level. One index number may be selected from a predetermined transmission mode table, and if one index number has been selected, a combination of information corresponding to the selected index number becomes setting information in a new transmission mode. FIG. 9 illustrates an example of a table representing such a combination of information, which will be described more in detail later.

The link recommendation command 751 includes a link-recommendation-request command 752 requesting a transmitter that transmits the transmission packet to recommend setting information in the transmission mode to a receiver that receives the transmission packet, and a link-recommendation-response command 75$v$3 instructing the transmitter to respond to the link recommendation request made by the receiver.

The link-recommendation-request command 752 includes an HRP mode field 752$d$ that records information on an HRP mode and an LRP mode field 752$c$ that records information on an HRP mode. In addition, the link-recommendation-request command 752 may further include a command ID field that records an ID of the link-recommendation-request command 752, a length field 752$b$ that indicates the length of the link-recommendation-request command 752, and a reserved field 752$e$ that is reserved for later use.

The lengths of the aforementioned fields are 8 bits (1 octet) for the command ID field 752$a$ and the length field 752$b$, 1 bit for the LRP mode field 752$c$, and 6 bits for the reserved field 752$e$.

The link-recommendation-response command 753 includes an HRP mode field 753$d$ and an LRP mode field 753$c$. In addition, the link-recommendation-response command 753 may further include a command ID field 753$a$ that records an ID of the link-recommendation-request command 752 is recorded, a length field 753$b$ that indicates the length of the link-recommendation-response command 753, and a reserved field 753$e$ that is reserved for later use.

The lengths of the aforementioned fields are 8 bits for the command ID field 753$a$ and the length field 753$b$, 4 bits for the HRP mode field 753$d$ and the LRP mode field 753$c$, and 8 bits for the reserved field 753$e$.

FIG. 9 is a drawing illustrating an HRP mode index table according to an exemplary embodiment of the present invention. As mentioned above, the table records the mode index recorded in HRP mode fields 752$d$ and 753$d$ and a combination of information corresponding to the mode index.

Referring to FIG. 9, it is defined that the HRP mode index can have a value in the range of 0 to 6. However, this is merely one exemplary embodiment of the present invention, and 4 bits can have a value in the range of 0 to 15.

A field displaying items such as grouping information (the number of bit levels included in a single group), a code rate, and a modulation method may be separately arranged. However, according to exemplary embodiments of the present invention, a plurality of combinations of the items can be illustrated in a single index using the mode index. The items in the table of FIG. 9 are preset and should be transmitted from the source device to the sink device.

If the HRP mode index is in the range of 0 to 2, equal error protection (EEP) is applied, and if the HRP mode index is in the range of 3 to 4, UEP is applied. If the HRP mode index is 3, quadrate phase shift keying (QPSK) is applied as a modulation method, and if the HRP mode index is 4, 16-quadrature amplitude modulation (QAM) is applied. Here, a relatively low code rate of 4/7 is applied with respect to the upper bit level and a relatively high code rate of 4/5 is applied with respect to the lower bit level. However, the average code rate with respect to the overall bit levels is 2/3, the size of the data-to-be-transmitted is the same as the size thereof when the HRP mode index is in the range of 1 or 2. If the HRP mode index is in the range of 5 to 6, retransmission is executed due to the occurrence of an error. At this time, the upper bit level with relatively high significance is retransmitted at a code rate of 1/3, whereas the lower bit level with relatively low significance is not transmitted because the code rate is infinite.

Figure 10:
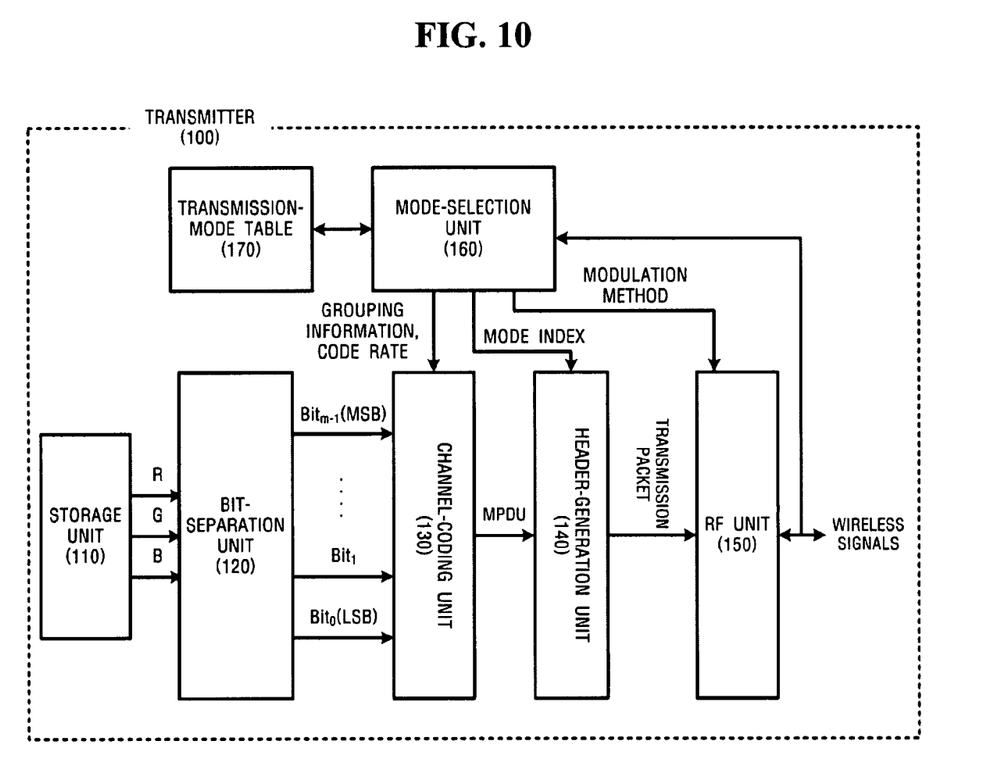
FIG. 10 is a drawing illustrating a of a transmitter according to an exemplary embodiment of the present invention.

FIG. 10 is a drawing illustrating a configuration of a transmitter 100 according to an exemplary embodiment of the present invention. The transmitter 100 may include a storage unit 110, a bit-separation unit 120, a channel-coding unit 130, a header-generation unit 140, a radio frequency (RF) unit 150, a mode-selection unit 160, and a transmission-mode table 170.

The storage unit 110 stores uncompressed AV data. If the AV data is video data, a subpixel value of each pixel is stored. The subpixel value may be stored as a variety of values depending on a color space being used (e.g., a RGB color space or a YCbCr color space). However, each pixel in the exemplary embodiment of the present invention comprises R (red), G (green), and B (blue) according to the RGB color space. If the video data is a gray image, a pixel may be composed of a single subpixel or two or four subpixels since there is only one subpixel that exists.

The bit-separation unit 120 separates the subpixels provided from the storage unit 110 from the highest degree (highest bit level) to the lowest degree (lowest bit level). For example, an 8-bit video has degrees from $2^7$ to $2^0$, and thus can be separated into a total of 8 bits. "Bit$_{m-1}$" denotes the bit of (m−1)th degree and "m" denotes the bit number of the pixel and. Such a bit-separation process is individually executed with respect to each subpixel.

The channel-coding unit 130 executes error-correction-coding at a suitable code rate according to significance, and generates a payload. There are two principle types: block codes and convolutional codes. A block code (e.g., Reed-Solomon code) is a technique for encoding and decoding data within a specific block and a convolutional code is a technique for encoding and decoding the data by comparing previous data with current data using a memory of a specific length.

Generally, the error-correction coding is a process in which the $K^{th}$ bit being input is converted into the $N^{th}$ bit codeword. Here, the code rate is denoted as "k/n". As the code rate decreases, data is coded in a larger bit codeword than an input bit, thereby increasing the possibility of correcting errors. A payload, i.e., MPDU 750 is formed by an accumulation of the error-correction coding results.

The header generation unit 140 appends a preamble 710, a PHY header 720, and a MAC header 730 to the MPDU 750 composed of a plurality of coded transmission data units (TDUs), and forms a transmission packet 700 of FIG. 7. Here, the HRP mode index is recorded in the PHY header 720. As described above, the HRP mode index refers to a combination of grouping information (TDU grouping method), a code rate, and a modulation method, and is provided by the mode selection unit 160.

The RF unit 150 demodulates a transmission packet provided by the header-generation unit 140 using a modulation method provided from the mode-selection unit 160, and transmits the packet through an antenna.

Based on a transmission state of the transmission packet, the mode-selection unit 160 selects one mode index from a transmission mode table 170 as illustrated in FIG. 9. The mode-selection unit 160 provides grouping and code rate information according to the mode index to the channel-coding unit 130, and provides a modulation method according to the mode index to the RF unit 150.

Figure 11:
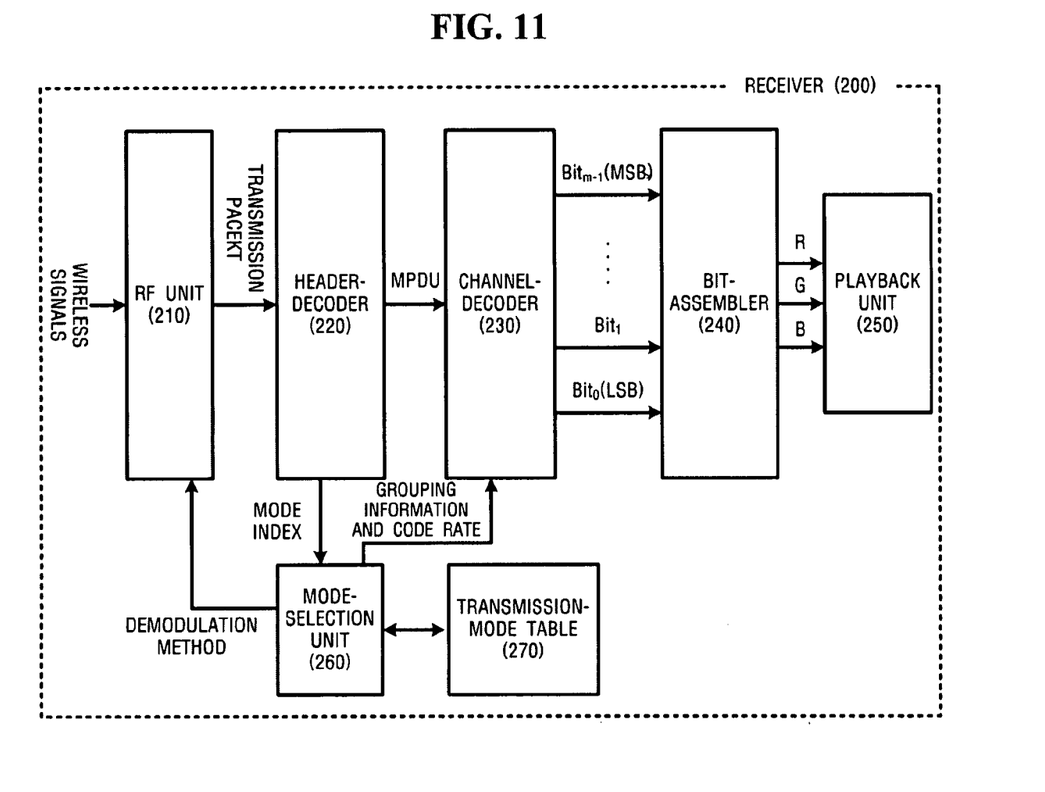
FIG. 11 is a drawing illustrating a configuration of a receiver according to an exemplary embodiment of the present invention.

FIG. 11 is a drawing illustrating a configuration of a receiver 200 according to an exemplary embodiment of the present invention. The receiver may include an RF unit 210, a header decoder 220, a channel-decoder 230, a bit-assembler 240, a playback unit 250, a mode-selection unit 260, and a transmission-mode table 270.

The RF unit 210 demodulates received wireless signals, and restores the transmitted packet. The modulation method used herein may be provided from the mode-selection unit 260.

The header-decoder 220 decodes the PHY header and the MAC header appended in the header-generation unit 140 of FIG. 10, and provides MPDU with the headers removed, i.e., a payload to the channel-decoder 230. Here, the header-decoder decodes the mode index recorded in the PHY header 720, and provides the mode index to the mode-selection unit 260.

The mode-selection unit 260 refers to the transmission-mode table 270, selects grouping information corresponding to all indices, a code rate, and a modulation method provided by the header-decoder 220. The modulation method is provided to the RF unit 210, and the grouping information and the code rate is provided to the channel-decoder 230. The RF unit 210 demodulates wireless signals according to the modulation method.

The channel-decoder checks types of TDUs forming a current MPDU via grouping information (the number of bit levels included in a TDU) provided by the mode-selection unit 260, and executes error-correction decoding at the rate applied to the TDU. Error-correction decoding is the opposite of error-correction encoding including a process in which the $N^{th}$ bit codeword is restored to the $K^{th}$ bit.

The bit-assembler 240 combines the output bits by bit levels (from the highest level to the lowest level), and restores the subpixel elements (e.g., R, G, and B). The subpixel elements then are provided to the playback unit 250.

Once a video frame is complete, the playback unit 250 collects the subpixel elements, and displays the video frame in sync with a playback-synchronization signal on a cathode ray tube (CTR), a liquid crystal display (LCD), or a plasma display panel (PDP).

Although uncompressed AV data has been described, it should be apparent to those skilled in the art that the same method can be applied to uncompressed audio data such as a wave file.

Each component described with reference to FIGS. 10 and 11 means, but is not limited to, a software or hardware component, such as a Field Programmable Gate Array (FPGA) or an Application Specific Integrated Circuit (ASIC), which executes certain tasks. A module may be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, according to the exemplary embodiments of the present invention, the following effects may be achieved.

First, according to an exemplary embodiment of the present invention, a new link-adaptation mechanism can be provided that can efficiently and logically adapt to an ever-changing transmission state in high-frequency wireless telecommunications, a stored transmission packet used therein, and a method and apparatus for transmitting and receiving the stored transmission packet.

Second, according to an exemplary embodiment of the present invention Link Assessment, using information on a forward channel state, in which the transmission is executed from a source device to a sink device, can be utilized.

The exemplary embodiments of the present invention have been explained with reference to the accompanying drawings, but it will be apparent to those skilled in the art that various modifications and changes may be made thereto without departing from the scope and spirit of the invention. Therefore, it should be understood that the above exemplary embodiments are not restrictive but illustrative in all aspects.

What is claimed is:

1. A transmission packet used in a link-adaptation mechanism for a network comprising a source device and a sink device, the transmission packet comprising:
a payload of comprising at least one transmission data unit; and at least one header, wherein the link adaptation mechanism comprises:
a Link Assessment operation, in which at least one of a state of a channel, provided between the source device and the sink device, and a quality of a first, packet transmitted from the source device to the sink device is assessed by the sink device;
the Link Recommendation operation, in which a transmission mode suitable for the channel is recommended by the sink device which uses a result of the Link Assessment operation and transmits the transmission packet to the source device, the payload of the transmission packet comprising a link recommendation command in which information on the recommended transmission mode for the channel is recorded; and a Link Adjustment operation, in which the an existing transmission mode of the source device is adjusted using the information on the recommended transmission mode;

wherein the recommendation command included in the payload of the transmission packet comprises:

a high-rate PHY (HRP) mode field that records information on an HRP mode for the recommended transmission mode; and a low-rate PHY (LRP) mode field that records information on an LRP mode for the recommended transmission mode.

2. The transmission packet of claim 1, wherein the at least one header comprises a media access control (MAC) header and a physical layer (PHY) header, and wherein the recommended transmission mode is included in an MAC protocol data unit (MPDU) of the transmission packet.

3. The transmission packet of claim 1, wherein the Link Recommendation operation is performed by the sink device in response to a link-recommendation-request command which is transmitted from the source device to the sink device to request the sink device to transmit to the source device the link recommendation command recording therein the information on the recommended transmission mode.

4. The transmission packet of claim 1, wherein the transmission packet is a second packet transmitted from the sink device to the source device after an acknowledgment (ACK) of the first packet is transmitted from the sink device to the source device.

5. The transmission packet of claim 4, wherein the link recommendation command included in the payload of the transmission packet comprises:

a high-rate PHY (HRP) mode field that records information on an HRP mode for the recommended transmission mode;

a low-rate PHY (LRP) mode field that records information on an LRP mode for the recommended transmission mode, and wherein the command ID field and the length field have a length of 8 bits, the HRP mode field and LRP mode field have a length of 1 bit, and the reserved field has a length of 6 bits.

6. The transmission packet of claim 1, wherein, based on the link recommendation command, the source device adjusts a parameter for at least one of unequal error protection, beam-searching, a high-rate PHY (HRP) mode and a low-rate PHY (LRP) mode.

7. The transmission packet of claim 6, wherein the HRP mode field records a mode index that is a combination of information on a coding mode, a modulation method, a number of bit levels included in a transmission data unit, and a code rate of each of the bit levels.

8. The transmission packet of claim 1, wherein the HRP mode field records a mode index that is a combination of information on a coding mode, a modulation method, a number of bit levels included in a transmission data unit, and a code rate of each of the bit levels.

9. The transmission packet of claim 1, wherein the link recommendation command further comprises:

a command identification (ID) field that records an ID of the link recommendation command;

a length field that indicates a length of the link recommendation command; and a reserved field that is reserved for later use.

10. The transmission, packet of claim 9, wherein the link recommendation command included in the payload of the transmission packet comprises:

a high-rate PHY (HRP) mode field that records information on an HRP mode for the recommended transmission mode;

a low-rate PHY (LRP) mode field that records information on an LRP mode for the recommended transmission mode, and wherein the command ID field and the length field have a length of 8 bits, the HRP mode field and the LRP mode field have a length of 4 bits, and the reserved field has a length of 8 bits.

11. A transceiver performing a link-adaptation mechanism, the transceiver comprising:

an input/output unit which transmits and receives a transmission packet which comprises at least one header and a payload; and a packet generation unit which generates the transmission packet, wherein the link-adaptation mechanism comprises:

a Link Assessment operation, in which at least one of a state of a channel, provided between a source device and a sink device, and a quality of a first packet transmitted from the source device to the transceiver, which is a sink device, is assessed by the transceiver;

the Link Recommendation operation, in which the transmission mode suitable for the channel is recommended by the transceiver which uses a result of the Link Assessment operation and transmits the transmission packet to the source device, the payload of the transmission packet comprising a link recommendation command in which information on the recommended transmission mode for the channel is recorded; and a Link Adjustment operation, in which an existing transmission mode of the source device is adjusted using the information on the recommended transmission mode;

wherein the link recommendation command included in the payload of the transmission packet comprises:

a high-rate PHY (HRP) mode field that records information on an HRP mode for the recommended transmission mode; and a low-rate PHY (LRP) mode field that records information on an LRP mode for the recommended transmission mode.

12. The transceiver of claim 11, wherein the at least one header comprises a media access control (MAC) header and a physical layer (PHY) header, and wherein the recommended transmission mode is included in an MAC protocol data unit (MPDU) of the transmission packet.

13. The transceiver of claim 11, wherein the Link Recommendation operation is performed by the transceiver in response to a link-recommendation-request command which is transmitted from the source device to the transceiver to request the transceiver to transmit to the source device the link recommendation command recording therein the information on the recommended transmission mode.

14. The transceiver of claim 11, wherein the transmission packet is a second packet transmitted from the sink device to the source device after an acknowledgment (ACK) of the first packet is transmitted from the sink device to the source device.

15. The transceiver of claim 14, wherein the link recommendation command included in the payload of the transmission packet comprises:

a high-rate PHY (HRP) mode field that records information on an HRP mode for the recommended transmission mode;

a low-rate PHY (LRP) mode field that records information on an LRP mode for the recommended transmission mode, and wherein the command ID field and the length field have a length of 8 bits, the HRP mode field and the LRP mode field have a length of 1 bit, and the reserved field has a length of 6 bits.

16. The transceiver of claim 15, wherein the HRP mode field records a mode index that is a combination of information on a coding mode, a modulation method, a number of bit levels included in a transmission data unit, and a code rate of each of the bit levels.

17. The transceiver of claim 11, wherein the link recommendation command further comprises:
    a command identification ID field that records an ID of the link recommendation command;
    a length field that indicates a length of the link recommendation command; and
    a reserved field that is reserved for later use.

18. The transceiver of claim 17, wherein the link recommendation command included in the payload of the transmission packet comprises:
    a high-rate PHY (HRP) mode field that records information on an HRP mode for the recommended transmission mode;
    a low-rate PHY (LRP) mode field that records information on an LRP mode for the recommended transmission mode, and
    wherein the command ID field and the length field have a length of 8 bits, the HRP mode field and LRP mode field have a length of 4 bits, and the reserved field has a length of 8 bits.

19. The transceiver of claim 12, wherein the HRP mode field records a mode index that is a combination of information on a coding mode, a modulation method, a number of bit levels included in a transmission data unit, and a code rate of each of the bit levels.

20. A method of link adaptation between a source device and a sink device, the method comprising:
    performing a Link Assessment operation, in which at least one of a state of a channel, provided between the source device and the sink device, and a quality of a first packet transmitted from the source device to the sink device is assessed by the sink device;
    performing a Link Recommendation operation, in which a transmission mode suitable for the channel is recommended by the sink device which uses a result of the Link Assessment operation and transmits a transmission packet to the source device, the transmission packet comprising at least one header and a payload, the payload comprising a link recommendation command in which information on the recommended transmission mode for the channel is recorded; and
    performing a Link Adjustment operation, in which an existing transmission mode of the source device is adjusted using the information on the recommended transmission mode;
    wherein the link recommendation command included in the payload of the transmission packet comprises:
    a high-rate PHY (HRP) mode field that records information on an HRP mode for the recommended transmission mode; and
    a low-rate PHY (LRP) mode field that records information on an LRP mode for the recommended transmission mode.

21. The method of claim 20, wherein the at least one header comprises a media access control (MAC) header and a physical layer (PHY) header, and
    wherein the recommended transmission mode is included in an MAC protocol data unit (MPDU) of the transmission packet.

22. The method of claim 20, wherein the Link Recommendation operation is performed by the sink device in response to a link-recommendation-request command which is transmitted from the source device to the sink device to request the sink device to transmit to the source device the transmission packet including the link recommendation command recording therein the information on the recommended transmission mode.

23. The method of claim 20, wherein the transmission packet is a second packet transmitted from the sink device to the source device after an acknowledgment (ACK) of the first packet is transmitted from the sink device to the source device.

24. The method of claim 23, wherein the link recommendation command included in the payload of the transmission packet comprises:
    a high-rate PHY (HRP) mode field that records information on an HRP mode for the recommended transmission mode;
    a low-rate PHY (LRP) mode field that records information on an LRP mode for the recommended transmission mode, and
    wherein the command ID field and the length field have a length of 8 bits, the HRP mode field and the LRP mode field have a length of 1 bit, and the reserved field has a length of 6 bits.

25. The method of claim 20, wherein, based on the link recommendation command, the source device adjusts a parameter for at least one of unequal error protection, beam-searching, a high-rate PHY (HRP) mode and a low-rate PHY (LRP) mode.

26. The method of claim 20, wherein the link, recommendation command further comprises:
    a command identification (ID) field that records an ID of the link recommendation command;
    a length field that indicates a length of the link recommendation command; and
    a reserved field that is reserved for later use.

27. The method of claim 26, wherein the link recommendation command included in the payload of the transmission packet comprises:
    a high-rate PHY (HRP) mode field that records information on an HRP mode for the recommended transmission mode;
    a low-rate PHY (LRP) mode field that records information on an LRP mode for the recommended transmission mode, and
    wherein the command ID field and the length field have a length of 8 bits, the HRP mode field and the LRP mode field have a length of 4 bits, and the reserved field has a length of 8 bits.

28. The method of claim 20, wherein the HRP mode field records a mode index that is a combination of information on a coding mode, a modulation method, a number of bit levels included in a transmission data unit, and a code rate of each of the bit levels.

29. The method of claim 25, wherein the HRP mode field records a mode index that is a combination of information on a coding mode, a modulation method, a number of bit levels included in a transmission data unit, and a code rate of each of the bit levels.

* * * * *